Figure 1:
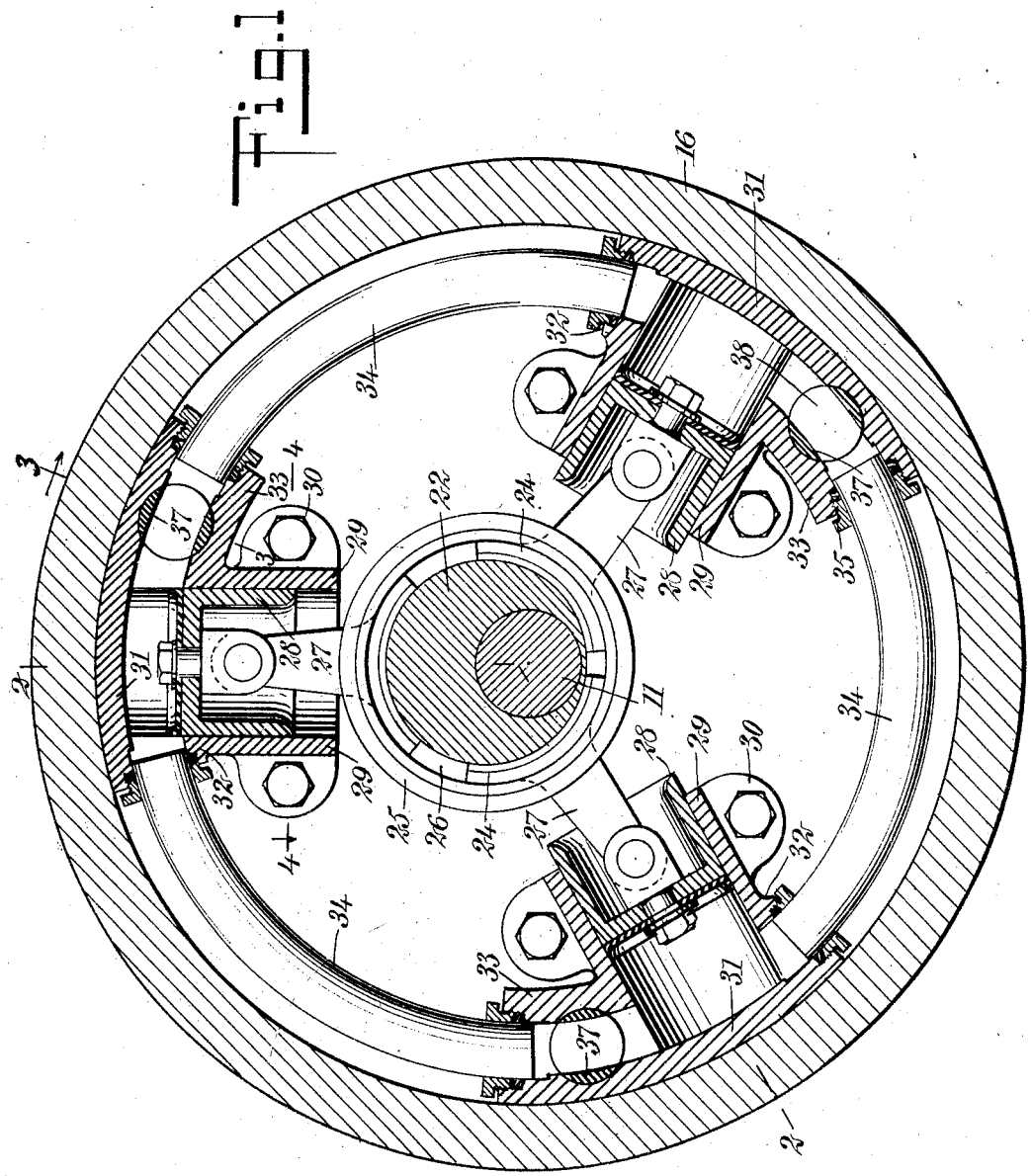

No. 874,259. PATENTED DEC. 17, 1907.
O. TORNFELT.
CLUTCH.
APPLICATION FILED MAR. 20, 1907.

2 SHEETS—SHEET 1.

WITNESSES
John a Bergstrom
C. W. Fairbank

INVENTOR
Oscar Tornfelt
BY Munn & Co
ATTORNEYS

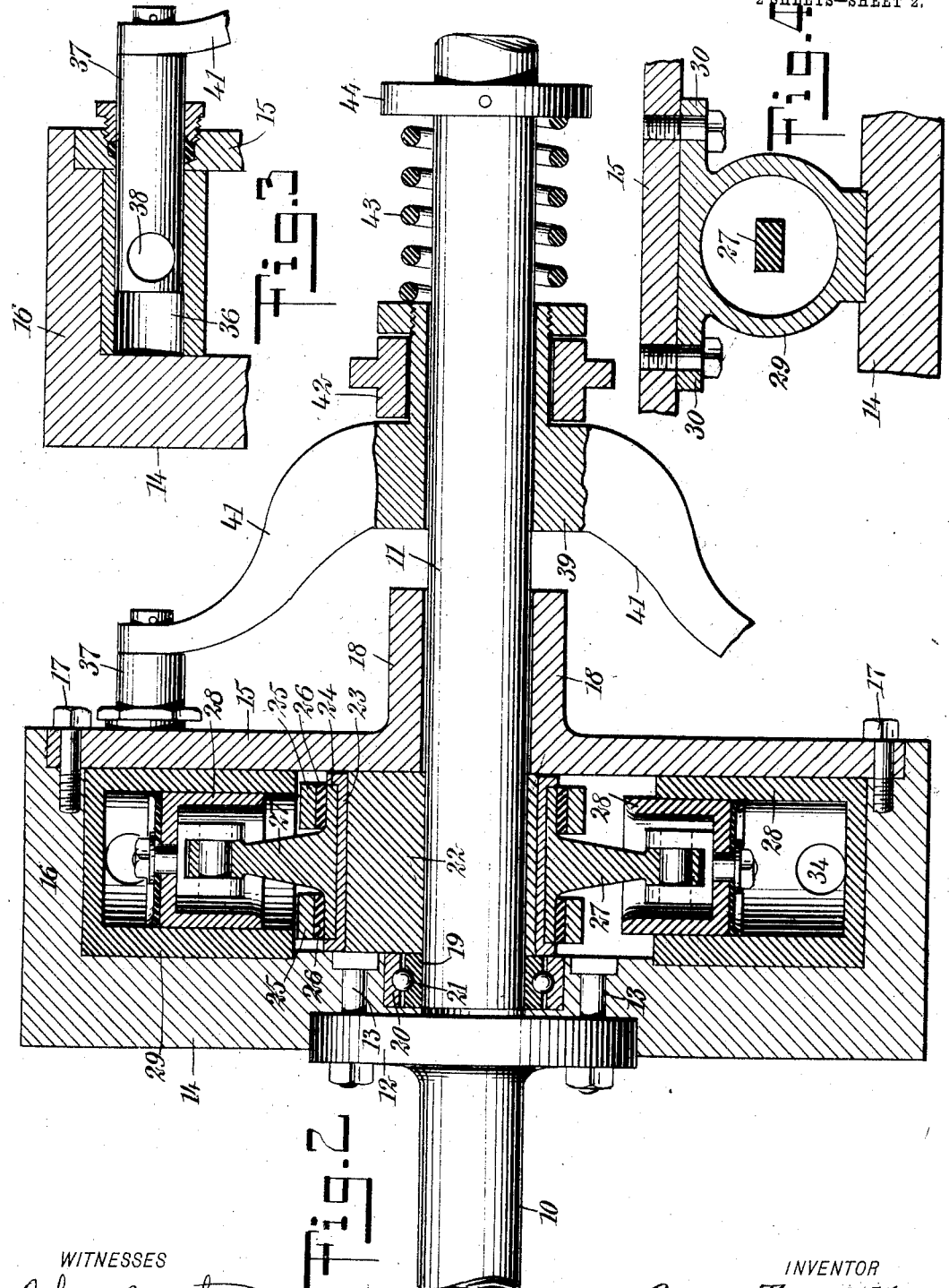

UNITED STATES PATENT OFFICE.

OSCAR TORNFELT, OF NEW YORK, N. Y.

CLUTCH.

No. 874,259. Specification of Letters Patent. Patented Dec. 17, 1907.

Application filed March 20, 1907. Serial No. 363,387.

*To all whom it may concern:*

Be it known that I, OSCAR TORNFELT, a subject of the King of Sweden, and a resident of the city of New York, borough of Manhattan, in the county and State of New York, have invented a new and Improved Clutch, of which the following is a full, clear, and exact description.

This invention relates to certain improvements in clutches, and more particularly to that type of clutch in which a fluid is continuously circulated within a closed circuit while the clutch is not in operation, and wherein the closing of the circuit to prevent the circulation of the fluid prevents relative movement of the driving member and driven member, thus causing one to be rotated by the other.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, and in which Figure 1 is a transverse section through a clutch constructed according to my invention; Fig. 2 is a central longitudinal section on the line 2—2 of Fig. 1; Fig. 3 is a detail section taken on the line 3—3 of Fig. 1; and Fig. 4 is a sectional detail on the line 4—4 of Fig. 1.

My improved clutch is adapted for use in connecting any suitable driving member to a driven member, and is preferably so constructed as to connect these members when they are in alinement with each other. The clutch comprises two parts separable from each other, one of said parts being connected to the driving member and the other of said parts being connected to the driven member. It is evident that either of the parts may be connected to either member, but I preferably connect the part including the casing to the driving member, whereby this casing may constitute at the same time a fly wheel or balance wheel.

In the drawings I have illustrated portions of two shafts 10 and 11, either of which may constitute the driving member but for clearness in description I will hereinafter refer to the shaft 10 as the driving shaft and the shaft 11 as the driven shaft. The drive shaft 10 is provided with an annular flange or collar 12 integral therewith or rigidly secured thereto, and to this collar is fastened by means of bolts 13 a casing comprising oppositely disposed annular end walls 14 and 15 connected together by a circumferential wall 16. The last mentioned wall is preferably formed integral with one of the end walls and is formed of such a thickness as to provide the desired balance wheel effect. The other end wall, as, for instance 15, is rigidly bolted to the circumferential wall 16 by screw bolts 17, or in any other suitable manner, and is provided with an annular collar 18 serving as a guide and bearing for the driven shaft 11. This shaft extends through the casing into a recess in the end wall 14 and is there preferably provided with an annular ball race 19 spaced from an oppositely disposed ball race 20 by a plurality of ball bearings 21.

Within the casing and rigidly secured to the shaft 11 is an eccentric 22 of a length substantially equal to the interior distance between the end walls 14 and 15 and adapted to rotate within the casing and with the shaft 11. The circumferential face of the eccentric is provided with a sleeve 23 of anti-friction metal serving to form a bearing surface, and in engagement with this surface are a plurality of segment-shaped plates 24. Surrounding said plates adjacent each end thereof and serving to hold them in engagement with the bearing surface of the eccentric are two oppositely disposed rings 25. Intermediate the rings and the segment-shaped plates 24 I may, if desired, provide lining members 26 of any suitable anti-friction metal. Rigidly secured thereto or integral with each of the bearing plates 24 I provide outwardly extending rods 27 adapted to serve as piston rods, inasmuch as the outer end of each is pivotally connected to a corresponding piston 28. These pistons may be of any suitable character and normally operate in lines radially disposed in respect to the driven shaft 11. Surrounding each piston and forming the cylinder thereof, I provide a member 29 having outwardly extending flanges 30, whereby it may be rigidly secured to the end wall 15, and having an oppositely disposed surface adapted to engage with the opposite end wall 14. The casing may, if desired, set into a recess in said wall 14, or may, if desired, be provided with a radial flange fitting into a corresponding groove in said wall. The inner end of the cylinder is in open communication with the interior of the main casing and the outer end may be closed by a suitable end plate 31, or may be closed by the circumferential wall 16 of the main casing.

Each cylinder adjacent its outer end is provided with a pair of outwardly extending annular flanges 32 and 33 upon opposite sides and forming inlet and outlet ports to said cylinders, all of the ports of the cylinders lying in a curve concentric with the shaft 11. Connecting the flange 32 of each cylinder to the flange 33 of the next adjacent cylinder, I provide suitable conduits 34 also lying concentric with the shaft 11 and secured to said flanges by suitable packing boxes 35. The flanges 33 are formed of considerably greater width than the flanges 32, and through each of these longer flanges I provide a suitable valve, whereby the flow of the fluid through the ports may be readily controlled. In forming these valves I preferably provide a cylindrical recess 36 extending through the end wall 15 of the casing and through the flanges 33 and lying substantially parallel to the shaft 11. Within each of these cylindrical recesses I provide a cylindrical valve plug 37 longitudinally movable and provided with an opening 38 which may be brought into alinement with the ports of the cylinders by the longitudinal movement of the cylindrical valve plug to the proper position. The conduits 34, as is indicated in Fig. 2, are located intermediate the end walls 14 and 15 of the casing, and the opening 38 through each valve plug is formed adjacent the end thereof, whereby when the valve is forced inwardly to its limiting position the opening is brought out of engagement with the adjacent port and the circulation of the liquid is prevented. By pulling outward on the valve 37 the port is opened and free circulation permitted.

In order to move all of the valve plugs simultaneously, I provide a collar 39 on the shaft 11, and having outwardly extending arms 41 secured in any suitable manner to the outer end of the valve plugs. By moving the collar 39 longitudinally of the shaft, all of the valve plugs are simultaneously operated. Any suitable means, as, for instance, a collar 42 may be provided for longitudinally moving the collar 39, and a spring 43 abutting against a collar 44 may be provided for normally holding the valves in one of their two positions.

In the operation of my improved clutch the shaft 10 is rotated by any suitable prime mover and the shaft 11 is connected to any device which it is desired to operate. The rotation of the shaft 10 causes the rotation of the casing and the cylinders mounted therein, but as the pistons may freely reciprocate within the casings, the plates 24 move about the surface of the eccentric without resulting in any rotation on the part of the latter. As soon as the several valves 37 are moved so as to prevent the circulation of liquid through the conduits a resistance is offered to the reciprocation of the pistons, and as said pistons can no longer reciprocate, the plates 24 must maintain a constant distance from the shaft 11, and the latter is caused to rotate with the drive shaft 10. The cylinders are rigidly secured to the end wall 15, and either the bearing sleeve 23 may be slidable upon the cam 22, or the cam may be slidably but non-rotatably mounted upon the shaft. By removing the screws 17 and loosening the collars 44 and 39, the valves 37 may be drawn entirely out of the valve casings and the end wall 15 carrying the cylinders and pistons therein may be moved a sufficient distance away from the circumferential wall of the casing to permit an inspection or repair of the operating mechanism normally within said casing. Thus, the cylinders and pistons are thoroughly protected while in use, but may be readily exposed to view without affecting the relative adjustment of the parts.

By providing the special form of reciprocating valves shown the operating mechanism for said valves is rendered far simpler than any similar device heretofore constructed, and by supporting the pistons and cylinders in the manner hereinbefore described, a very rigid and effective construction is provided suitable for general use.

Having thus described my invention, I claim as new and desire to secure by Letters Patent:

1. In a clutch, the combination of a cylindrical casing having oppositely disposed end walls, a plurality of cylinders detachably secured to one of said walls and carried thereby and fitting within recesses in the opposite wall, said cylinders being radially disposed, means coacting with said cylinders for causing the circulation of a fluid, and means for controlling said circulation.

2. In a clutch, the combination of a cylindrical casing having oppositely disposed end walls, a plurality of radially disposed cylinders mounted within said casing and detachably secured to one of said end walls and fitting within radially disposed recesses in the opposite end wall, means coacting with said cylinders for causing the circulation of a fluid, and means for controlling said circulation.

3. In a clutch, the combination of a cylindrical casing having oppositely disposed end walls detachably secured together, a plurality of cylinders radially disposed within said casing and each having flanges detachably secured to one of said end walls, the other of said end walls being provided with recesses into which portions of said cylinders extend, means co-acting with said cylinders for causing the circulation of a fluid, and means for controlling said circulation.

4. In a clutch, the combination of a cylindrical casing having oppositely disposed end walls, and a plurality of cylinders radially disposed within said casing and having flanges detachably securing said cylinders to one of said end walls and the other of said end walls being provided with radially disposed recesses into which said cylinders extend, whereby the cylinders are carried by one end wall but supported against lateral movement by both end walls.

5. In a clutch, the combination of a cylindrical casing having oppositely disposed end walls, a plurality of cylinders detachably secured within said casing and radially disposed in respect thereto, valve casings integral with said cylinders, conduits connecting said cylinders and valve casings in series, and reciprocating valves disposed parallel to the axis of rotation and mounted within said valve casings for controlling the circulation of a fluid.

In testimony whereof I have signed my name to this specification in the presence of two subscribing witnesses.

OSCAR TORNFELT.

Witnesses:
LAWRENCE KEHOE,
CLAUDE MOORE.